United States Patent [19]

Hagwood et al.

[11] Patent Number: 4,747,475

[45] Date of Patent: May 31, 1988

[54] SUSPENSION WEAR COMPENSATING SHOCK ABSORBER

[75] Inventors: Stephen C. Hagwood, Dayton; Michael D. Clark, Bellbrook, both of Ohio

[73] Assignee: General Motors Corporation, Detroit, Mich.

[21] Appl. No.: 944,787

[22] Filed: Dec. 22, 1986

[51] Int. Cl.⁴ ............................................. F16F 9/50
[52] U.S. Cl. ............................. 188/322.15; 251/333
[58] Field of Search ............ 188/284, 322.13, 322.14, 188/322.15; 251/205, 333

[56] References Cited

U.S. PATENT DOCUMENTS

| | | | |
|---|---|---|---|
| 3,199,636 | 8/1965 | de Carbon | 188/322.15 X |
| 3,375,345 | 3/1968 | Schweller | 219/107 |
| 3,621,949 | 11/1971 | Watson | 188/284 |
| 4,352,417 | 10/1982 | Stinson | 188/322.15 |

Primary Examiner—Duane A. Reger
Attorney, Agent, or Firm—Charles R. White

[57] ABSTRACT

The capability of this shock absorber or damper changing the energy of motion into heat progressively increases as the suspension components progressively wear and become more flexible over their service life. This is accomplished by the use of flow controlling concentric seats of different heights on the rebound valve element. As the outer and higher seat wears down, the working area of the valve element decreases with the inner seat being operative to increase the load to generally compensate for the reduction in friction in the suspension thereby providing a more consistent ride as a function of use.

5 Claims, 1 Drawing Sheet

SUSPENSION WEAR COMPENSATING SHOCK ABSORBER

This invention relates to shock absorbers for damping the action of vehicle suspensions and more particularly to a shock absorber with valving whose effective area decreases as a function of use during its service life to provide higher damping loads to compensate for suspension wear.

Shock absorbers are generally designed to work with optimized efficiency to control the action of a suspension having predetermined and inherent friction characteristics. However, these friction characteristics change as the suspension components are subject to wear during their service life and become freer to move. While prior shock absorbers have effectively controlled the action of the suspension components over their service lives, they generally do not meet higher standards for compensation for suspension wear as in the present invention.

It is a feature, object and advantage of this invention to increase shock absorber damping load during its service life to compensate for the reduction in friction occurring in a suspension system during its service life.

Another feature, object and advantage of this invention is to provide a shock absorber with a rebound valve disk or element having concentric seats with different heights and as the higher and outer seat wears down to the height of the inner seat, the working area of the valve disk decreases thereby providing higher damping loads to compensate for suspension wear.

Another feature, object and advantage of this invention is to provide a shock absorber that naturally wears and increases damping loads to compensate for reduced friction in suspension system that naturally occurs during its service life with the use of concentric seats at different heights on a valve element that controls fluid flow.

Another feature, object and advantage of this invention is to provide a new and improved rebound control for a shock absorber having an orifice plate with rebound flow through a centralized orifice that displaces a flow controlling valve disk therefrom until an outer and higher fluid sealing seat wears and an inner seat becomes the fluid sealing seat so that the effective area of the valve disk is reduced to increase the damping action of the shock absorber.

In a preferred embodiment of the invention, there is a blow off orifice configuration and low speed damping is provided by small orifices in the orifice plate. Oil flows through these small openings creating a positive fluid pressure and resulting damping load by the shock absorber. As the piston velocity increases and fluid pressure builds, the fluid forces the rebound valve to blow off against a spring allowing more fluid to flow through the increased open area so that the damping load can increase during the service life of the suspension. The rebound valve disk has concentric outer and inner seats which have different heights and as the higher outer seat wears down, the working area of the valve disks decreases as seen by the oil flow. When the inner seat becomes effective, higher damping loads are provided, thus, compensating for wear of the suspension components. Without this compensation, the suspension would be freer to move producing a change in ride feel.

In the present invention, optional orifice locations on the outer seat serve the same purpose for low speed control. As the outer ring seat wears down the orifice area closes down to zero and no longer permits flow to supplement the flow area of the orifice plate. Accordingly, this invention improves ride consistency by providing increased damping control as a function of suspension wear which is highly efficient and effective and can be incorporated for both compression (jounce) and rebound control.

These and other features, objects and advantages will be more apparent from the following detailed description and drawing in which.

Figure 1:
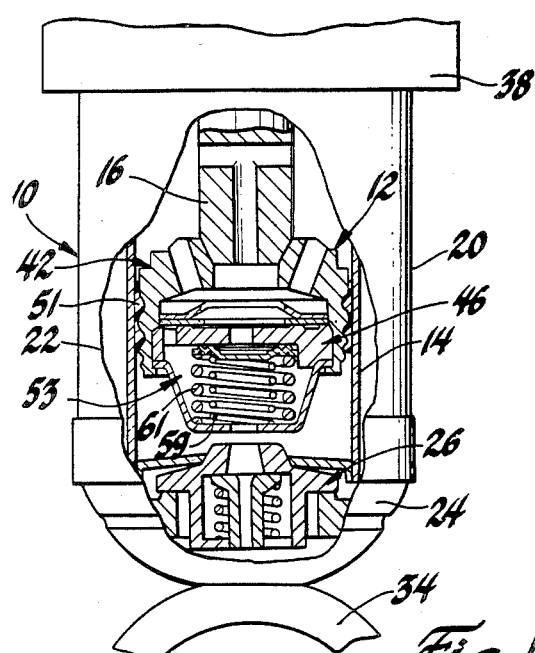
FIG. 1 is an elevational view with parts in cross section of a portion of a double-acting hydraulic shock absorber according to this invention.

Turning now in greater detail to the drawing, there is shown in FIG. 1 a portion of a double-acting hydraulic shock absorber 10 for controlling the action of a vehicle suspension which may include a conventional control arm, control arm bushings, suspension springs and related components, not shown. An exemplary suspension of this general type is disclosed in U.S. Pat. No. 3,727,937 entitled Vehicle Suspension Control Arm, issued Apr. 17, 1973, assigned to the assignee of this invention and hereby incorporated by reference. The shock absorber 10 is generally of the type described in U.S. Pat. No. 3,621,949, issued Nov. 23, 1971 to B. L. Watson also assigned to the assignee of this invention and hereby incorporated by reference.

The shock absorber has a valved piston assembly 12 that is mounted for reciprocating movement in a cylinder tube 14 filled with shock absorber fluid. A piston rod 16 has its lower end secured to the piston assembly 12 and extends upwardly therefrom through a rod guide, an upper seal and seal cover, such as disclosed in the B. L. Watson U.S. Pat. No. 3,621,949, referenced above, and then into connection with the sprung mass of the vehicle, not illustrated.

The shock absorber 10 has a cylindrical reservoir tube 20 disposed around the cylinder tube 14 and cooperates therewith to form a reservoir 22 for the shock absorber fluid of this unit. The reservoir tube is closed by a base cup 24 sealingly secured thereto. A conventional base valve 26 secured in the bottom of the cylinder tube is seated in the base cup and has a centralized valve 32 which provides for restricted flow of fluid between the cylinder tube below piston assembly 12 and the reservoir 22 when the piston strokes in the cylinder tube as is well known in this art. The mounting ring 34, secured to the bottom of the base cup 24, provides means to secure one part of the telescoping shock absorber to the unsprung mass of the vehicle. A dust tube 38, of which only the lower end portion is shown, surrounds the reservoir tube and is conventionally attached by a cover plate to the piston rod and is accordingly movable therewith. The upper end of the piston rod is attached to the spring mass of the vehicle in a conventional manner.

Figure 3:
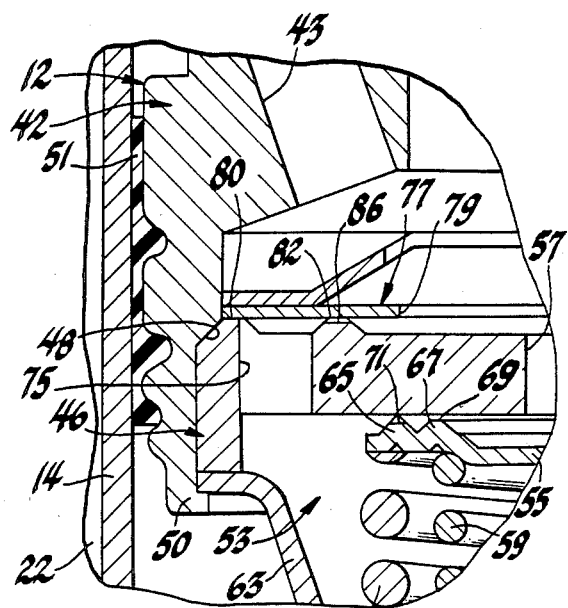
FIG. 3 is an enlarged view of a portion of the valving of the piston assembly of FIG. 2 illustrating a modification of the invention.
Figure 2:
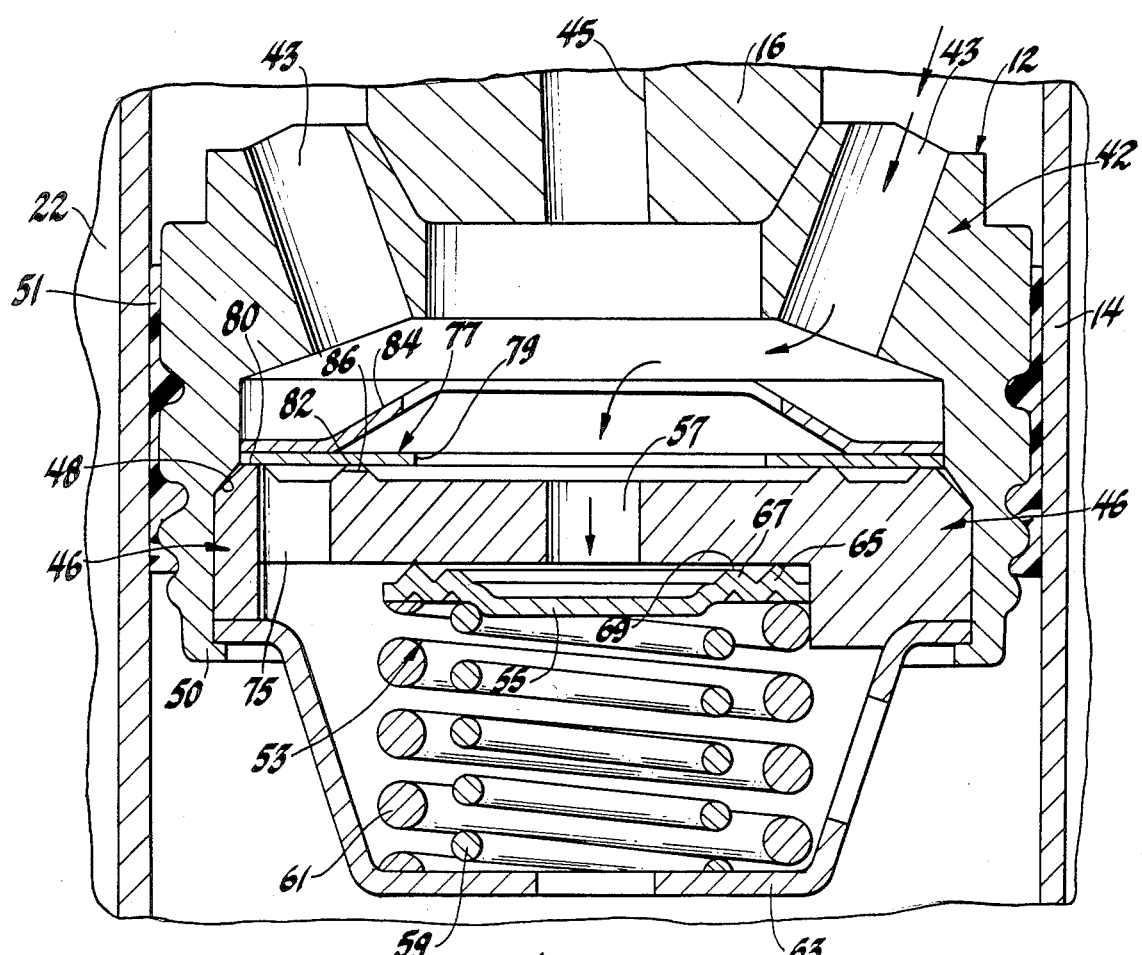
FIG. 2 is an enlarged view of the piston and a portion of the cylinder tube of the shock absorber of FIG. 1.

FIG. 2 shows details of the valving of the piston assembly of the preferred embodiment of this invention. This piston assembly has a shell-like main body 42, with fluid flow openings 43 therein, welded to the lower end of the piston rod 16. The piston rod 16 has a rebound cut-off passage 45 formed therein which operates as described in the above-referenced patent to B. L. Watson. The main body 42 of the piston houses a generally cylindrical orifice plate 46 peripherally secured within the main body between an inner annular locator shoulder 48 and an inwardly coined lower annular end 50. Element 51 is a conventional annular sliding seal fitted on the piston shell and sealingly contacts the inner wall of the cylinder tube 14. A blow off valve assembly 53 comprised of a rebound valve disk or element 55 biased against the lower surface of the orifice plate 46 to close the central orifice opening 57 by a pair of helical springs 59 and 61. These springs are mounted in a hat-shaped cage 63 and are retained in position by the inwardly coined end 50 of the piston body as illustrated in FIG. 2. The rebound valve disk 55 has special concentric valve construction to provide a wear compensating feature for accommodating the reduction in friction of the suspension components as they wear during use. In the preferred embodiment of this invention, disk 55 has a large diameter valve seat 65 that is higher than the small diameter valve set 67. The annular outer valve seat 65 initially provides annular sealing engagement with the lower surface of the orifice plate 46 to close orifice opening 57 until a predetermined blow off pressure is obtained. This seat will wear down evenly in a natural manner during use as the friction in the suspension components decreases. When sufficiently worn, the inner seat 67 with an upper sealing surface 69, flattened for long wear, becomes the sealing seat to present a smaller diameter blow off valve so that resistance or load is increased. If desired, small radial orifices 71 on the outer seat 65 may be provided for low speed control as seen in FIG. 3. As this outer seat wears down, the orifice area provided by orifices 71 closes to zero and no longer permits supplemental flow therethrough.

In addition to the central orifice, the orifice plate 46 has peripherally located intake passages 75 which are controlled by an intake valve disk 77 that has a central opening 79 and is normally biased into a closed position on the concentric valve seats 80, 82 formed on the orifice plate 46 by a conventional wave-type intake valve spring 84 that is grounded onto the inner surfaces of the piston housing.

Low speed damping is provided by small radial orifices 86 in the annular valve seat 82 of the orifice plate 46. The oil flows through these small openings 86 creating a positive fluid pressure and resultant damping load by the shock absorber. As the piston velocity increases, and fluid pressure builds, the fluid forces the rebound valve to blow off against the action of the rebound springs.

In summary of this invention, damping load is increased to compensate for reduced friction as the suspension system progresses through its service life. This is done by the concentric seats which are of different heights. As the outer seat wears down, the working area of the disk decreases as seen by the oil flow. This permits higher damping loads to be generated, thus compensating for suspension wear. The orifice location on the outer seat which may be optional and shown in FIG. 2 serves the same purpose for low speed control. As the outer ring seat wears down, the orifice area closes down to zero and no longer permits flow supplementing the flow area of the small orifices of the orifice plate. Accordingly, this design permits increased damping control to be provided as a function of suspension wear which is more effective than a time or heat function. While the technique is incorporated for rebound control it can be readily incorporated for compression or jounce control.

While a preferred embodiment of this invention has been shown and described to illustrate this invention, other embodiments employing the concepts and ideas of this invention will now become apparent to those skilled in the art. Accordingly, the scope of this invention is set forth in the following claims.

The embodiments of the invention in which an exclusive property or privilege is claimed are defined as follows:

1. A hydraulic damper having an orifice plate with an opening therethrough, a valve disk for controlling the flow through said opening, spring means for biasing said valve disk toward said opening, said disk having a first annular seat of a first diameter and a first height encompassing said opening to sealingly engage said orifice plate and establish valving means of a first area that is displaced from said opening on the attainment of a first pressure level, said disk having a second annular seat of a second diameter less than said first diameter and encompassing said opening and having a height less than that of said first seat so that the effective area of said disk is changed only when said first seat wears to a point where said second seat effectively seals said opening in said orifice plate and is displaced from said opening only on the buildup of a pressure level greater than said first pressure level to permit the passage of fluid through said opening.

2. The valving construction defined in claim 1 and further having an orifice providing an auxiliary orifice are a that extends across said first annular seat so that as said outer seat wears said auxiliary orifice area closes down toward zero.

3. The valving construction of claim 1 wherein said second seat has a flattened upper annular sealing surface for direct sealing contact with said orifice plate encompassing said opening therein subsequent to predetermined wear of said first seat.

4. A hydraulic damper having a valve plate with an opening therethrough, a valve disk for controlling the flow through said opening, spring means for biasing said valve disk toward said opening, said disk having a first annular fluid sealing seat of a first diameter and a first height encompassing said opening to establish valving means of a first area that is displaced from said sealing engagement with said plate to clear said opening on the attainment of a first pressure level, said disk having a second annular seat of a second diameter less than said first diameter encompassing said opening and having a height less than that of said first seat so that the effective area of said disk is changed only when said first seat wears to a point where said second seat effectively seals said opening and is displaced from said opening only on the buildup of a pressure of that is greater than said first pressure level to permit the passage of fluid through said opening.

5. The valving construction defined in claim 4 and further having a radial orifice extending across said first annular fluid sealing seat so that as said first annular fluid sealing seat wears the orifice area provided by said radial orifice closes down toward zero so that the flow supplemental passage thereby provided is eliminated.

* * * * *